(12) United States Patent
Chen et al.

(10) Patent No.: US 9,013,843 B2
(45) Date of Patent: Apr. 21, 2015

(54) MULTIPLE DEVICE VOLTAGE ELECTROSTATIC DISCHARGE CLAMP

(71) Applicant: Taiwan Semiconductor Manufacturing Company, Ltd., Hsin-Chu (TW)

(72) Inventors: Yu-Ren Chen, Zhudong Township (TW); Guang-Cheng Wang, Zhubei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 13/683,586

(22) Filed: Nov. 21, 2012

(65) Prior Publication Data

US 2014/0063665 A1 Mar. 6, 2014

Related U.S. Application Data

(60) Provisional application No. 61/695,622, filed on Aug. 31, 2012.

(51) Int. Cl.
| | |
|---|---|
| *H02H 9/00* | (2006.01) |
| *H02H 9/04* | (2006.01) |
| *H01C 7/12* | (2006.01) |
| *H02H 1/00* | (2006.01) |
| *H02H 1/04* | (2006.01) |
| *H02H 3/22* | (2006.01) |
| *H02H 9/06* | (2006.01) |

(52) U.S. Cl.
CPC .................................. *H02H 9/041* (2013.01)

(58) Field of Classification Search
CPC .................................................. H01L 27/0248
USPC .......................................................... 361/56
See application file for complete search history.

(56) References Cited

U.S. PATENT DOCUMENTS

| 8,531,806 B2 * | 9/2013 | Jalilizeinali et al. ............ 361/56 |
| 2013/0229736 A1 * | 9/2013 | Van Der Borght et al. ..... 361/56 |

* cited by examiner

*Primary Examiner* — Dharti Patel
(74) *Attorney, Agent, or Firm* — Slater & Matsil, L.L.P.

(57) ABSTRACT

A multiple device voltage electrostatic discharge (ESD) clamp includes a trigger circuit, first and second inverters, and an ESD discharge path. The trigger circuit includes a resistor having a first terminal electrically connected to a first voltage supply node, and a capacitor having a first terminal electrically connected to a second voltage supply node. The first inverter has an input terminal electrically connected to second terminals of the resistor and the capacitor. The second inverter has a power terminal electrically connected to an output terminal of the first inverter. The ESD discharge path has a first end electrically connected to the first voltage supply node, and a second end electrically connected to a third voltage supply node, and includes a first transistor controlled by the first inverter, and a second transistor controlled by the second inverter.

20 Claims, 10 Drawing Sheets

MULTIPLE DEVICE VOLTAGE ELECTROSTATIC DISCHARGE CLAMP

This application claims the benefit of U.S. Provisional Application Ser. No. 61/695,622, filed on Aug. 31, 2012, entitled "Multiple Device Voltage Electrostatic Discharge Clamp", which application is hereby incorporated herein by reference.

BACKGROUND

The semiconductor industry has experienced rapid growth due to improvements in the integration density of a variety of electronic components (e.g., transistors, diodes, resistors, capacitors, etc.). For the most part, this improvement in integration density has come from shrinking the semiconductor process node (e.g., shrinking the process node towards the sub-20 nm node). As device dimensions shrink, voltage nodes also shrink, with modern core device voltages trending toward less than 1 Volt, and input/output (I/O) device voltages under 2 Volts. Devices operating at such low voltages are sensitive to high voltages, which worsens reliability concerns for legacy systems that move to new process nodes while maintaining old system voltage parameters (e.g., using 1.8V devices in 5V system applications).

One danger to integrated circuits in nearly all process nodes is electrostatic discharge, or ESD. When an ESD event occurs, a large amount of charge builds up rapidly at a circuit node, such as a pad, which has the potential of introducing a very high voltage that will damage integrated circuit devices if not mitigated. ESD protection circuits are often designed into integrated circuits to rapidly sense and respond to the ESD charge by draining the charge to ground before devices in the integrated circuit are damaged. Because ESD circuits are expected to handle large voltage spikes, they are typically very large. And, with greater device sensitivity to high voltages, ESD circuits are even more likely to encounter reliability issues.

BRIEF DESCRIPTION OF THE DRAWINGS

For a more complete understanding of the present embodiments, and the advantages thereof, reference is now made to the following descriptions taken in conjunction with the accompanying drawings, in which.

DETAILED DESCRIPTION OF ILLUSTRATIVE EMBODIMENTS

Figure 1:
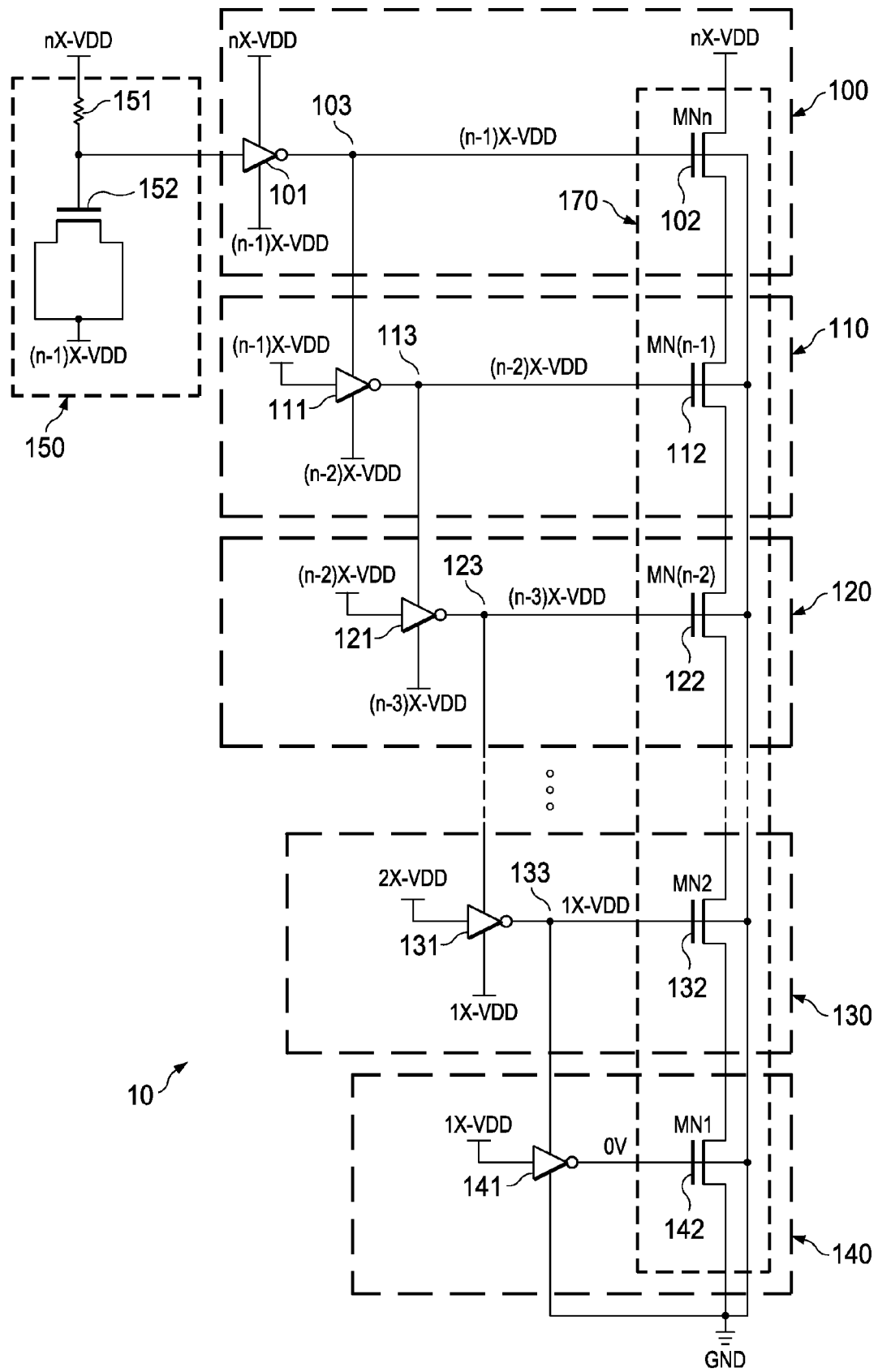
FIG. 1 is a diagram of an N-type nX-VDD ESD clamp in accordance with various embodiments of the present disclosure.

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments.

Embodiments will be described with respect to a specific context, namely a low area nX-VDD ESD clamp circuit, and the like. Other embodiments may also be applied, however, to other types of ESD circuits.

Throughout the various figures and discussion, like reference numbers refer to like components. Also, although singular components may be depicted throughout some of the figures, this is for simplicity of illustration and ease of discussion. A person having ordinary skill in the art will readily appreciate that such discussion and depiction can be and usually is applicable for many components within a structure.

Circuits are typically powered and/or biased by multiple voltages. The multiple voltages set up potential differences that allow electrical currents to flow throughout the circuit to perform various functions. Typically, electrical currents are defined as flowing from high voltage to low voltage. Voltage sources in circuits are also often defined in terms of a supply voltage and ground, with ground representing 0 Volts. Other definitions are sometimes given in terms of an upper supply voltage (VDD, VCC), and a lower supply voltage (VSS, VEE). Thus, a circuit that operates on a 1.8 Volt supply may be defined as having an upper bias of 0.9 Volts, and a lower bias of −0.9 Volts. In the following description, the term "ground" should be interpreted as including low supply voltage, such as the −0.9 Volts in the previous example, unless specifically referred to as "earth ground," or the like. Voltage levels, being relative, are not then intended so much to limit the scope of the disclosure, but more as a point of reference for convenient illustration.

Metal-oxide-semiconductor (MOS) transistors are typically described in terms of four transistor terminals: a gate, a source, a drain, and a bulk. It should be appreciated that most MOS transistors are symmetrical devices, such that the source and the drain thereof are interchangeable, and the terms "source" and "drain" often represent nomenclature for convenience of discussion. Terminals of MOS transistors may also be referred to as "electrodes," "ends," and the like, without any distinction intended through use of these different names. Biasing of such terminals is usually performed through direct or indirect contact between a direct current (DC) voltage source and the terminal being biased. The contact may be through metallization layers, contact vias, pads, bumps, and/or similar interconnect structures formed on and over device regions of the MOS transistors.

ESD circuits provide protection for voltage-sensitive devices in integrated circuits. The ESD circuits are usually placed at circuit nodes that are susceptible to static discharge, such as circuit pads. For example, in an integrated circuit die, one or two ESD cells may be tied to all contact bumps in the die to mitigate electrostatic discharge caused by handling of the die during packaging and/or assembly. An ESD circuit is required to sense electrostatic discharge, react by draining the charge accumulated on the pad to ground, and then turn off once the charge is drained to save power in normal operation.

In the following disclosure, a novel nX-VDD ESD clamp architecture with high discharge device utilization rate and ready expansibility is introduced. The nX-VDD ESD clamp uses stacked inverters as bias circuits and an RC-charge scheme to improve trigger efficiency and reduce layout area. The nX-VDD ESD clamp also has improved peak voltage performance for both single block and double block applications. N-type, P-type, and hybrid discharge path variations of the nX-VDD ESD clamp are disclosed herein, which provides flexibility for design across diverse process requirements.

An nX-VDD ESD clamp 10 (or simply "ESD clamp 10") in accordance with various embodiments of the present disclosure is shown in FIG. 1. The nX-VDD ESD clamp 10 shown in FIG. 1 is an N-type ESD clamp. The nX-VDD ESD clamp 10 has a single RC trigger circuit 150, which is biased between nX-VDD and (n-1)X-VDD (e.g., 3.3 Volts and 1.8 Volts for a 2X-VDD system). Multiple clamp stages 100, 110, 120, ..., 130, 140 are stacked as shown in FIG. 1, with the first clamp stage 100 electrically connected to the RC trigger circuit 150, and each subsequent stage 110, 120, ..., 130, 140 electrically connected to its corresponding previous stage. For example, the third clamp stage 120 is electrically connected to the second clamp stage 110, which is electrically connected back to the first clamp stage 100. MOSFETs 102, 112, 122, ..., 132, 142 of the clamp stages 100, 110, 120, ..., 130, 140 form an ESD discharge path 170 from the top voltage supply node to ground for discharging ESD zapping charge.

The number of clamp stages is determined by a multiple of device voltage VDD of the nX-VDD ESD clamp 10. A 2X-VDD ESD clamp includes only two stages, for example, while a 3X-VDD ESD clamp includes only three stages. The terms "nX-VDD," "2X-VDD," "3X-VDD" and the like should not be interpreted narrowly as meaning exactly "n times VDD," "twice VDD," "three times VDD," and so forth. Instead, such terms roughly indicate a multiple relationship existing between the device voltage VDD and the system voltage environment that the device voltage operates in. For example, a 1.8 Volt device voltage used in a 3.3 Volt system voltage environment may correspond to "2X-VDD" (3.3/1.8=1.83, which is near 2), and a 0.9 Volt device voltage used in the 3.3 Volt system voltage environment may correspond to "3X-VDD" or "4X-VDD" (3.3/0.9=3.67, which is near 3 and 4). A design consideration, then, is how much voltage devices in the process node can withstand without adversely affecting reliability, and how many stages are needed to distribute the system voltage over enough devices that no one device in a chain is exposed to a voltage that is outside device voltage tolerances.

The RC trigger circuit 150 is configured to sense an ESD event, and trigger the first clamp stage 100 to drain ESD charge, then turn off the first clamp stage 100 once the ESD charge is sufficiently drained. A resistor 151 of the RC trigger circuit 150 is electrically connected from a top voltage supply node to an input node of the first clamp stage 100, and a capacitor 152 of the RC trigger circuit 150 is electrically connected from a first intermediate voltage supply node to the input node of the first clamp stage 100. A first electrode of the resistor 151 is electrically connected to the top voltage supply node, and a second electrode of the resistor 151 is electrically connected to the input node. The capacitor 152 may be a metal-oxide-semiconductor (MOS) capacitor, a metal-oxide-metal (MOM) capacitor, or the like. Drain, source, and bulk electrodes of the capacitor 152 may be electrically connected to the first intermediate voltage supply node, and a gate electrode of the capacitor 152 may be electrically connected to the input node. If a MOS capacitor is used for the capacitor 152, the first capacitor 152 is a lower voltage device than system voltage of the integrated circuit that the ESD clamp 10 protects (e.g., 1.8 Volt device for a 3.3 Volt system voltage).

In the first clamp stage 100, a first inverter 101 has an input electrically connected to the input node, an output electrically connected to an internal node 103 of the first clamp stage 100, a first power terminal electrically connected to the top voltage supply node, and a second power terminal electrically connected to the first intermediate voltage supply node. The first inverter 101 may be a complementary MOS (CMOS) inverter, for example, and operates to invert voltage from the input to the output thereof. For example, a high input voltage at the input causes the first inverter 101 to pull down voltage at the output (node 103) to voltage level of the first intermediate voltage supply node, and a low input voltage at the input causes the first inverter 101 to pull up voltage at the output to voltage level of the top voltage supply node. Devices of the first inverter 101 are lower voltage devices than system voltage of the integrated circuit that the ESD clamp 10 protects (e.g., 1.8 Volt devices for a 3.3 Volt system voltage).

A first metal-oxide-semiconductor field effect transistor (MOSFET) 102 of the first clamp stage 100 is an N-type MOS (NMOS) transistor, for example. The first MOSFET 102 is a lower voltage device than system voltage of the integrated circuit that the ESD clamp 10 protects (e.g., 1.8 Volt device for a 3.3 Volt system voltage). A gate electrode of the first MOSFET 102 is electrically connected to the node 103 (output of the first inverter 101), and a drain electrode of the first MOSFET 102 is electrically connected to the top voltage supply node. The gate electrode of the first MOSFET 102 is controlled by the first inverter 101.

A last clamp stage 140 ("nth clamp stage 140") of the ESD clamp 10 is electrically connected to a last intermediate clamp stage 130 ("(n-1)th clamp stage 130") and a bottom voltage supply node (e.g., ground). A last inverter 141 of the last clamp stage 140 has an input tied to a last intermediate voltage node. A first power terminal of the last inverter 141 is electrically connected to an internal node 133 of the last intermediate clamp stage 130, and a second power terminal of the last inverter 141 is electrically connected to the bottom voltage supply node. The last inverter 141 may be a complementary MOS (CMOS) inverter, for example, and operates to invert voltage from the input to the output thereof. For example, a high input voltage at the input thereof causes the last inverter 141 to pull down voltage at the output thereof to voltage level of the bottom voltage supply node (e.g., ground), and a low input voltage at the input thereof causes the last inverter 141 to pull up voltage at the output to voltage level of the last intermediate voltage node, which may be the device voltage (e.g., 1.8 Volts for a 1.8 Volt process). Devices of the last inverter 141 are lower voltage devices than system voltage of the integrated circuit that the ESD clamp 10 protects (e.g., 1.8 Volt devices for a 3.3 Volt system voltage).

A last MOSFET 142 of the last clamp stage 140 is an N-type MOS (NMOS) transistor, for example. The last MOSFET 142 is a lower voltage device than system voltage of the integrated circuit that the ESD clamp 10 protects (e.g., 1.8 Volt device for a 3.3 Volt system voltage). A gate electrode of the last MOSFET 142 is electrically connected to the output of the last inverter 141, and a drain electrode of the last MOSFET 142 is electrically connected to a source terminal of a last intermediate MOSFET 132 of the last intermediate clamp stage 130. A source terminal of the last MOSFET 142 is electrically connected to the bottom voltage supply node (e.g., ground). The gate electrode of the last MOSFET 142 is controlled by the last inverter 141.

Intermediate clamp stages 110, 120, . . . , 130 of the ESD clamp 10 have similar structure, and may be optional in the ESD clamp 10. For example, a 2X-VDD ESD clamp will have only the first and last clamp stages 100, 140, whereas a 3X-VDD ESD clamp will have one intermediate clamp stage. Description of the intermediate clamp stages 110, 120, . . . , 130 is provided here with reference to the first intermediate clamp stage 110. A first intermediate inverter 111 of the first intermediate clamp stage 110 has an input tied to the first intermediate voltage supply node. A top power terminal of the first intermediate inverter 111 is electrically connected to the node 103 (output of the first inverter 101), and a bottom power terminal of the first intermediate inverter 111 is electrically connected to a second intermediate voltage supply node. The first intermediate inverter 111 may be a complementary MOS (CMOS) inverter, for example, and operates to invert voltage from the input to the output thereof. For example, a high input voltage at the input thereof causes the first intermediate inverter 111 to pull down voltage at the output thereof to voltage level of the second intermediate voltage supply node, and a low input voltage at the input thereof causes the first intermediate inverter 111 to pull up voltage at the output to voltage level of the first intermediate voltage supply node. Devices of the first intermediate inverter 111 are lower voltage devices than system voltage of the integrated circuit that the ESD clamp 10 protects (e.g., 1.8 Volt devices for a 3.3 Volt system voltage).

A first intermediate MOSFET 112 of the first intermediate clamp stage 110 is an N-type MOS (NMOS) transistor, for example. The first intermediate MOSFET 112 is a lower voltage device than system voltage of the integrated circuit that the ESD clamp 10 protects (e.g., 1.8 Volt device for a 3.3 Volt system voltage). A gate electrode of the first intermediate MOSFET 112 is electrically connected to the output of the first intermediate inverter 111, and a drain electrode of the first intermediate MOSFET 112 is electrically connected to a source terminal of the first MOSFET 101 of the first clamp stage 100. A source terminal of the first intermediate MOSFET 112 is electrically connected to a drain terminal of the second intermediate MOSFET 121. The gate electrode of the first intermediate MOSFET 112 is controlled by the first intermediate inverter 111.

Voltage levels of the various supply nodes in FIG. 1 are set up to prevent any device in the ESD clamp 10 from exposure to a high potential difference across any two terminals thereof. For example, the top voltage supply node may have voltage equal to nX-VDD, and the first intermediate supply voltage node may have voltage equal to (n-1)X-VDD. The second intermediate supply voltage node may have voltage equal to (n-2)X-VDD. The last intermediate supply voltage node may have voltage equal to 1X-VDD, which is the device voltage of the process node (e.g., 1.8 Volts for a 1.8 Volt process). As an example, a 5X-VDD ESD clamp used in a 5 Volt system voltage with 0.9 Volt device voltage may have the top voltage supply node at 5 Volts (5X-VDD), the first intermediate supply voltage node at 4 Volts (4X-VDD), the second intermediate supply voltage node at 3 Volts (3X-VDD), a third intermediate supply voltage node at 2 Volts (2X-VDD), and the last intermediate supply voltage node at 1 Volt (1X-VDD). It should be appreciated that supply voltage nodes shown in FIG. 1 having the same supply voltage may be realized as single physical nodes and/or as independent physical nodes biased at similar voltage levels. For example, the second power terminal of the first inverter 101 and the input of the first intermediate inverter 111 may be tied to the same physical node, or may be tied to different physical nodes biased at substantially the same voltage level (e.g., (n-1)X-VDD).

Bulk terminals of the MOSFETs 102, 112, 122, . . . , 132, 142 are tied to the bottom supply voltage node (e.g., ground). In some embodiments, the bulk terminals of the MOSFETs 102, 112, 122, . . . , 132, 142 may be tied instead to respective source terminals of the MOSFETs 102, 112, 122, . . . , 132, 142 to alleviate reliability concerns. For example, the bulk terminal of the MOSFET 102 may be electrically connected to the source terminal of the MOSFET 102. In such embodiments, a deep n-well is added to separate individual p-wells corresponding to each MOSFET 102, 112, 122, . . . , 132, 142. For example, the MOSFET 102 may be formed in a first p-well, the MOSFET 112 may be formed in a second p-well separate from the first p-well, and so on. The first and second p-wells may be formed in a single deep n-well, for example.

In some embodiments, the MOSFETs 102, 112, 122, . . . , 132, 142 may have much larger device size than logic devices in the integrated circuit. Additional masks may also be used to improve ESD clamping performance. For example, an ESD implant and/or resist protect oxide (RPO, also termed "resist protection oxide," "resistance protection oxide," "resistance protective oxide," etc.) may be included in processing of the MOSFETs 102, 112, 122, . . . , 132, 142 to improve the ESD clamping performance of the MOSFETs 102, 112, 122, . . . , 132, 142.

Figure 2:
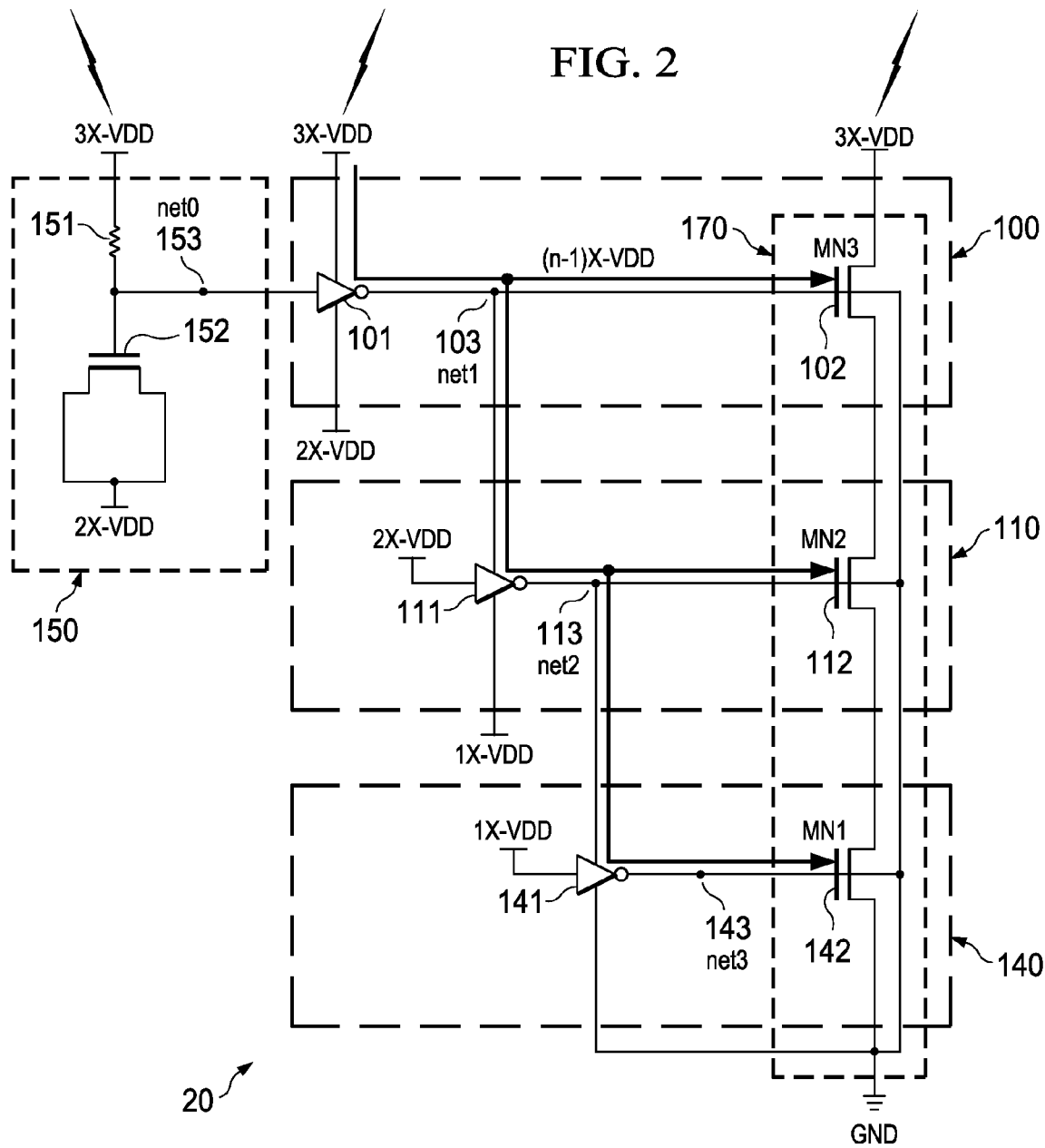
FIGS. 2 and 3 show operation of a 3X-VDD ESD clamp using the architecture shown in FIG. 1.
Figure 3:
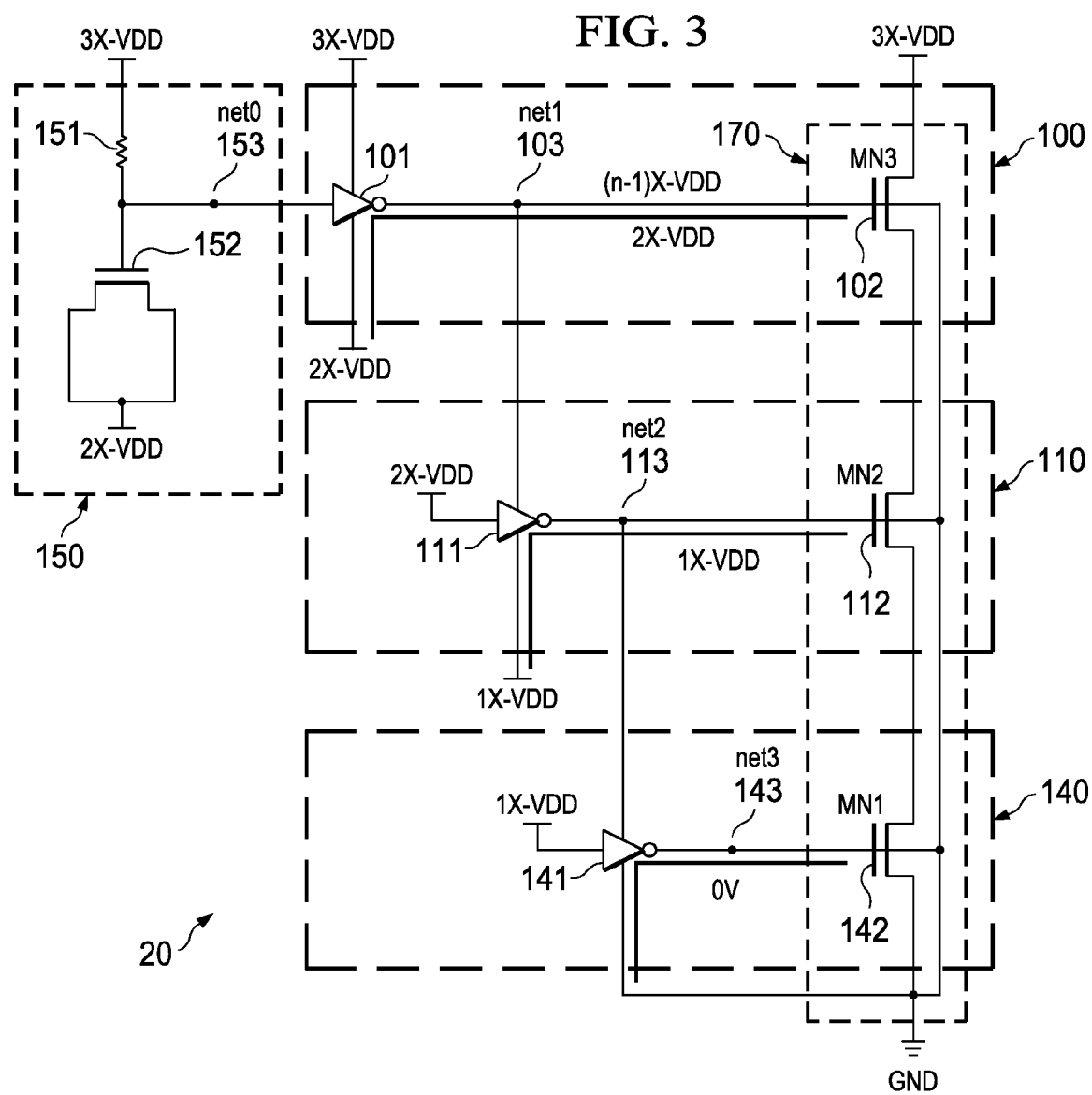

Operation of a 3X-VDD ESD clamp 20 (or simply "ESD clamp 20") using the architecture shown in FIG. 1 (n=3) is shown in FIG. 2 and FIG. 3. FIG. 2 shows ESD zapping operation of the 3X-VDD ESD clamp 20, and FIG. 3 shows normal operation of the 3X-VDD ESD clamp 20. The 3X-VDD ESD clamp 20 is chosen for descriptive purposes, and represents but one example (n=3) of the nX-VDD ESD clamp 10. The number n of clamp stages in the ESD clamp 10 may be any integer greater than or equal to 2.

ESD zapping as shown in FIG. 2 may occur when an integrated circuit die utilizing the ESD clamp 20 is not powered by an external power supply. The ESD zapping event may occur during transport, packaging, assembly, or other processing of the integrated circuit die, and is assumed to introduce a large, finite charge at the top voltage supply node of the ESD clamp 20. Because the ESD clamp 20 is not externally powered, initial voltage at a node 153 (input of first inverter 101) is floating prior to the ESD event, and the node 153 may be assumed to be grounded (at 0 Volts). When the ESD event occurs (as indicated by lightning bolts in FIG. 2), a large amount of ESD charge is introduced at the top supply voltage node of the ESD clamp 20. The top supply voltage node in FIG. 2 is electrically connected to the resistor 151, the first power terminal of the first inverter 101, and the drain of the first MOSFET 102. The ESD charge pulls up voltage at the node 103 through the first inverter 101. With the inputs of the first intermediate inverter 111 and the last inverter 141 floating (e.g., grounded), the voltage at the node 103 pulls up voltage at the node 113 through the first intermediate inverter 111, then the voltage at the node 113 pulls up the voltage at the node 143 through the last inverter 141. The nodes 103, 113, 143 correspond to the gate terminals of the first MOSFET 102, the first intermediate MOSFET 112, and the last MOSFET 142, respectively. With the voltages at the gate terminals of the three N-type MOSFETs 102, 112, 142 all pulled high, the MOSFETs 102, 112, 142 all turn on to drain the ESD charge from the top voltage supply node to ground through channels of the MOSFETs 102, 112, 142.

During normal operation of the integrated circuit, with the integrated circuit powered by a supply (e.g., a battery or a power supply), the ESD clamp 20 is expected to shut down and draw no current to save power. Biasing conditions for the ESD clamp 20 in normal operation are shown in FIG. 3. The RC trigger circuit 150 sets up a bias of 3X-VDD at the input of the first inverter 101. The first inverter 101 inverts the 3X-VDD voltage level (e.g., logic high) to the 2X-VDD voltage level (e.g., logic low) provided by the second power terminal thereof, thereby outputting the 2X-VDD voltage level at the output of the first inverter 101 (node 103). Likewise, the input of the first intermediate inverter 111 is tied to the 2X-VDD voltage level (e.g., logic high), and inverts the 2X-VDD voltage level to the 1X-VDD voltage level (e.g., logic low) at its output (node 113). The last inverter 141 receives the 1X-VDD voltage level at its input, and inverts the 1X-VDD voltage level to the voltage level of the bottom voltage supply node (e.g., ground or 0 Volts). Under these biasing conditions, the first MOSFET 102 has drain voltage of 3X-VDD, gate voltage of 2X-VDD, and source voltage of 2X-VDD minus one threshold voltage (1VT). The first intermediate MOSFET 112 has drain voltage of 2X-VDD minus 1VT, gate voltage of 1X-VDD, and source voltage of 1X-VDD minus 1VT. The last MOSFET 142 has drain voltage of 1X-VDD minus 1VT, gate voltage of 0 Volts (for example), and source voltage of 0 Volts (for example). As a result, the first MOSFET 102 and the first intermediate MOSFET 112 are both turned on (biased in the saturation region), and the last MOSFET 142 is turned off (biased in the cutoff region). In standby mode, no standby leakage current flows in the ESD clamp 20, and none of the MOSFETs 102, 112, 142 has a reliability concern.

Figure 4:
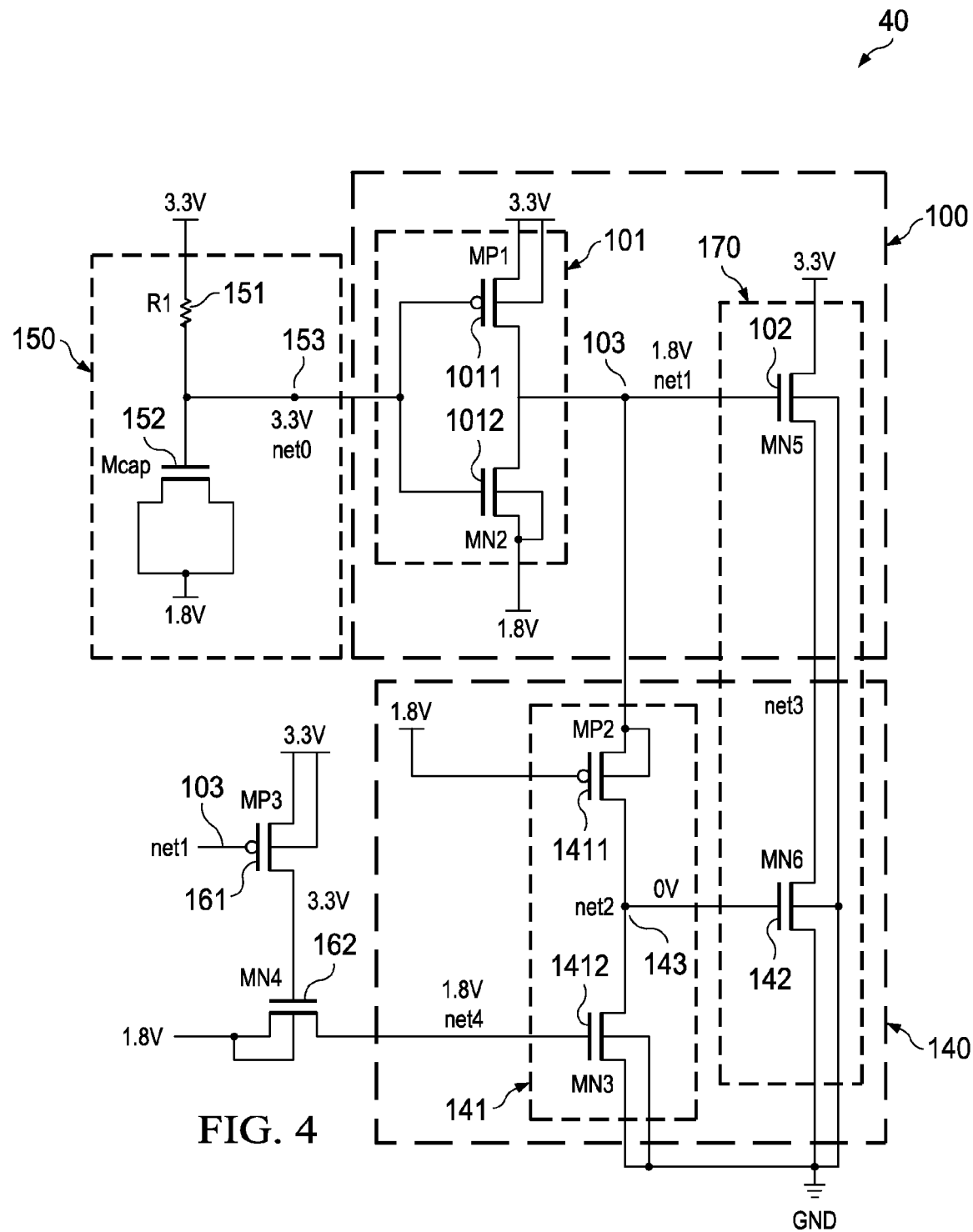
FIG. 4 is a detailed circuit diagram of a 2X-VDD ESD clamp in accordance with various embodiments of the present disclosure.

A detailed circuit diagram of a 2X-VDD ESD clamp 40 in accordance with various embodiments of the present disclosure is shown in FIG. 4. The 2X-VDD ESD clamp 40 is described for a 3.3-Volt system voltage (2X-VDD) and a 1.8-Volt device voltage (1X-VDD). Embodiments using other system voltages and/or device voltages are contemplated herein. The 2X-VDD clamp 40 includes the first clamp stage 100 and the last clamp stage 140, with no intermediate clamp stages. Circuitry of the first inverter 103 and the last inverter 142 are shown in detail in FIG. 4.

A first inverter PMOS 1011 of the first inverter 103 has a source terminal electrically connected to the top supply voltage node for receiving the 3.3-Volt system voltage (2X-VDD). A gate electrode of the first inverter PMOS 1011 is electrically connected to the node 153 of the RC trigger circuit 150, and a drain electrode of the first inverter PMOS 1011 is electrically connected to the node 103 (the gate of the first MOSFET 102). A bulk electrode of the first inverter PMOS 1011 is tied to the top voltage supply node. The first inverter PMOS 1011 is a 1X-VDD device (e.g., a 1.8 Volt device), and is used to pull up the voltage level of the node 103 when the first inverter PMOS 1011 is turned on. With the source electrode of the first inverter PMOS 1011 tied to the system voltage (e.g., 3.3 Volts), a voltage applied to the gate electrode thereof that is lower than the system voltage by a PMOS threshold voltage will turn on the first inverter PMOS 1011. Thus, a low voltage at the node 153 is inverted to become a high voltage at the node 103 through operation of the first inverter PMOS 1011 of the first inverter 101.

A first inverter NMOS 1012 of the first inverter 103 has a source terminal electrically connected to an intermediate voltage supply node for receiving the device voltage (1X-VDD, e.g. 1.8 Volts). A gate electrode of the first inverter NMOS 1012 is electrically connected to the node 153 of the RC trigger circuit 150, and a drain electrode of the first inverter NMOS 1012 is electrically connected to the node 103 (the gate of the first MOSFET 102). A bulk electrode of the first inverter NMOS 1012 is shown tied to the intermediate voltage supply node. In some embodiments, the bulk electrode of the first inverter NMOS 1012 may be tied to the bottom voltage supply node, which has lower voltage than the intermediate voltage supply node (e.g., 0 Volts vs. 1.8 Volts). The first inverter NMOS 1012 is a 1X-VDD device (e.g., a 1.8 Volt device), and is used to pull down the voltage level of the node 103 when the first inverter NMOS 1012 is turned on. With the source electrode of the first inverter NMOS 1012 tied to the device voltage (e.g., 1.8 Volts), a voltage applied to the gate electrode thereof that is higher than the device voltage by an NMOS threshold voltage will turn on the first inverter NMOS 1012. Thus, a high voltage at the node 153 is inverted to become a low voltage at the node 103 through operation of the first inverter NMOS 1012 of the first inverter 101.

The last inverter 141 is similar to the first inverter 101, with a few differences in electrical connections. A source electrode of a last inverter PMOS 1411 is electrically connected to the node 103. A drain electrode of the last inverter PMOS 1411 is electrically connected to the node 143 (the gate of the last MOSFET 142). A gate electrode of the last inverter PMOS 1411 is tied to the intermediate voltage supply node for receiving the 1X-VDD voltage (e.g., 1.8 Volts). A bulk electrode of the last inverter PMOS 1411 is tied to the source electrode thereof. In some embodiments, the bulk electrode of the last inverter PMOS 1411 may be electrically connected to the top voltage supply node.

A last inverter NMOS 1412 of the last inverter 141 has a drain terminal electrically connected to the node 143 (the drain terminal of the last inverter PMOS 1411), a source terminal electrically connected to the bottom voltage supply node (e.g., ground), and a gate terminal electrically connected to a biasing NMOS 162. A bulk electrode of the last inverter NMOS 1412 is tied to the bottom voltage supply node (e.g., ground).

The biasing NMOS 162 acts as a switch for passing a bias voltage (e.g., the device voltage, 1.8 Volts) to the gate electrode of the last inverter NMOS 1412. A source terminal of the biasing NMOS 162 is tied to the bias voltage, and a drain terminal of the biasing NMOS 162 is electrically connected to the gate electrode of the last inverter NMOS 1412. The biasing NMOS 162 is controlled at its gate electrode by a biasing PMOS 161. The gate electrode of the biasing NMOS 162 is electrically connectable to the top voltage supply node through a drain terminal, a channel, and a source terminal of the biasing PMOS 161. Conduction of current through the channel of the biasing PMOS 161 is controlled by voltage level at the node 103, which biases a gate electrode of the biasing PMOS 161.

In normal operation, with 3.3-Volt power applied to the integrated circuit die, the node 153 is biased at 3.3 Volts. The first inverter NMOS 1011 turns on to pull down the node 103 to 1.8 Volts due to the 3.3-Volt bias at its gate terminal. The 1.8-Volt bias on the node 103 biases the gate electrode of the first MOSFET 102, turning on the first MOSFET 102, and establishing a voltage of 1.8 Volts minus 1VT at the source of the first MOSFET 102 and the drain of the last MOSFET 142. The gate electrode of the biasing NMOS 162 is turned on due to being biased at 3.3 Volts by the turned-on biasing PMOS 161 that has the 1.8-Volt bias at its gate electrode. The biasing NMOS 162 being turned on sets up a 1.8-Volt bias at the gate terminal of the last inverter NMOS 1411, which turns on the last inverter NMOS 1411. The node 143 is pulled down to ground (e.g., 0 Volts) by the last inverter NMOS 1411, which turns off the last MOSFET 142. As a result, in normal operation, no standby leakage from the top voltage supply node to the bottom voltage supply node occurs.

Figure 5:
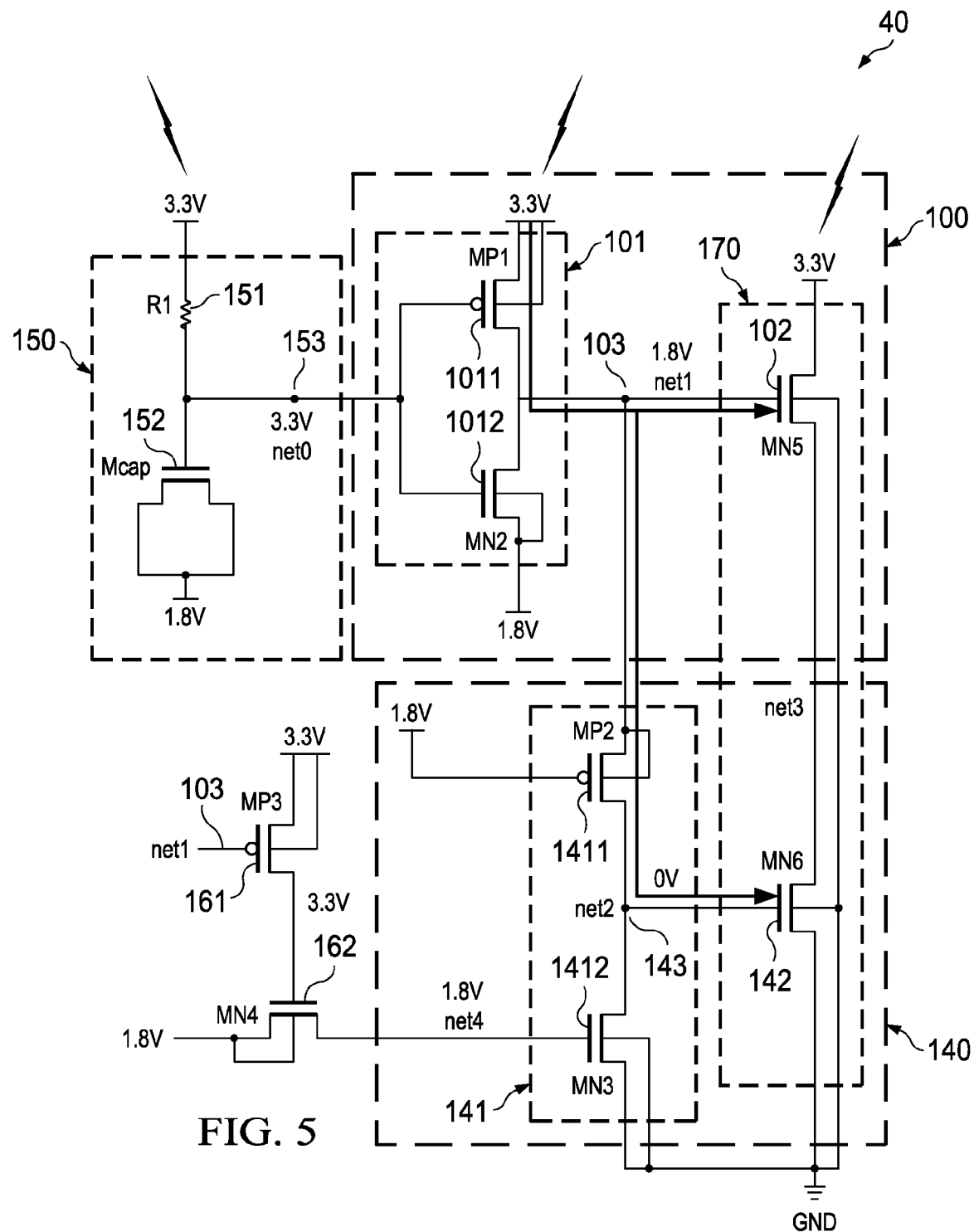
FIG. 5 is a diagram showing operation of the 2X-VDD ESD clamp during an ESD zapping event in accordance with various embodiments of the present disclosure.

Operation of the 2X-VDD ESD clamp 40 during an ESD zapping event in accordance with various embodiments of the present disclosure is shown in FIG. 5. During ESD stress on the top voltage supply node, the node 153 is floating, which is assumed to be around 0 Volts for an unpowered integrated circuit die. As such, the node 103 is biased at high voltage through the first inverter PMOS 1011 of the first inverter 101, which turns on the first MOSFET 102. With the intermediate voltage supply node also floating (e.g., about 0 Volts), the last inverter PMOS 1411 turns on, which biases the node 143 at the high voltage. The biasing of the node 143 at the high voltage turns on the last MOSFET 142. As a result, ESD charge caused by the ESD zapping event is discharged to ground from the top voltage supply node through the first MOSFET 102 and the last MOSFET 142.

Figure 6:
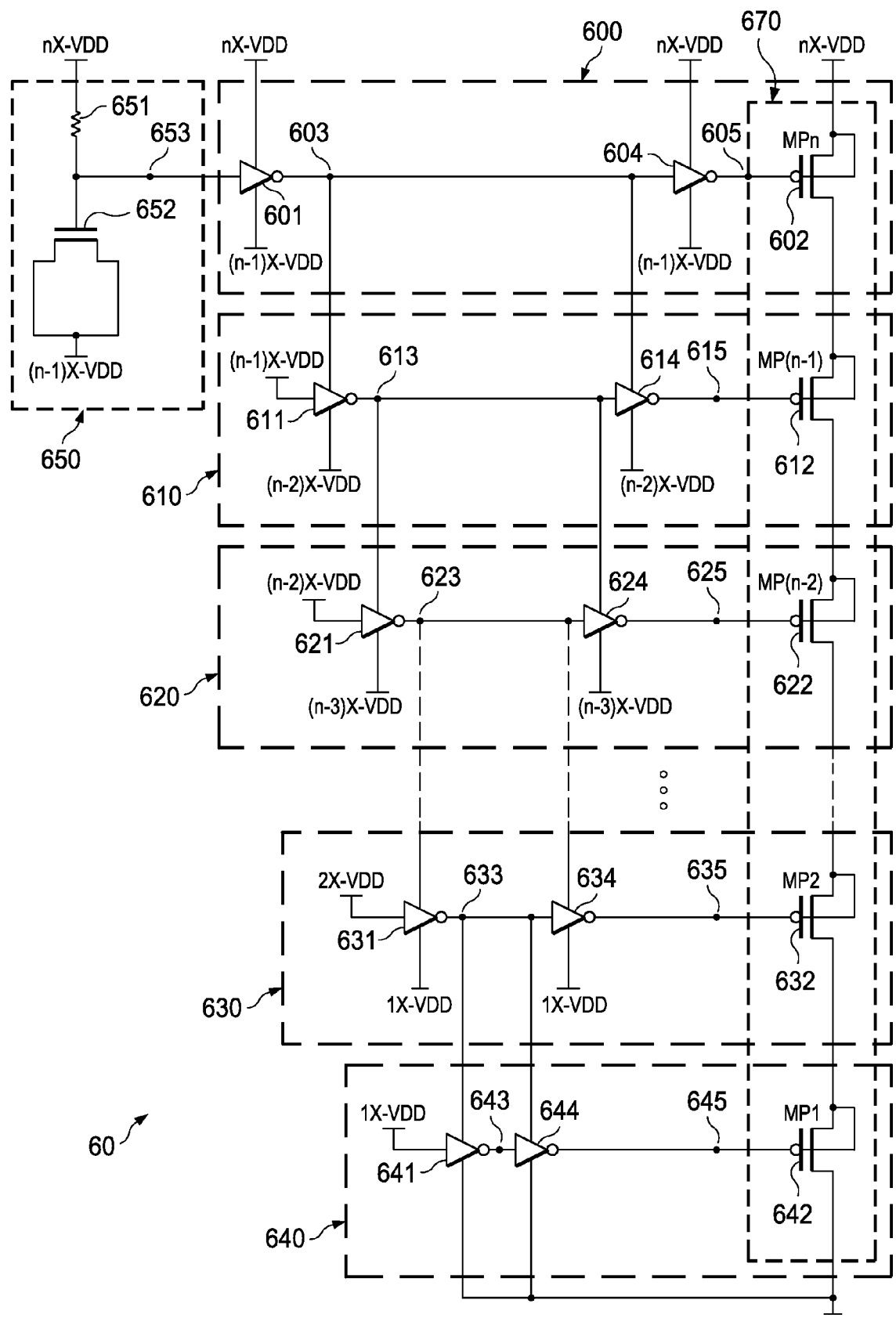
FIG. 6 is a circuit diagram showing a P-type nX-VDD ESD clamp in accordance with various embodiments of the present disclosure.

The ESD clamps 10, 20, 40 described above use N-type MOSFETs for the MOSFETs 102, 112, 122, . . . , 132, 142 thereof. A P-type nX-VDD ESD clamp 60 (or simply "ESD clamp 60") in accordance with various embodiments of the present disclosure is shown in FIG. 6. The ESD clamp 60 uses P-type MOSFETs 602, 612, 622, . . . , 632, 642 to form an ESD discharge path 670 that can discharge ESD charge to ground. Bulk and source terminals are tied together in the P-type MOSFETs 602, 612, 622, . . . , 632, 642 as shown in FIG. 6. In some embodiments, the bulk terminals may be tied instead to the top voltage supply node. The MOSFETs 602, 612, 622, . . . , 632, 642 may be formed in a single n-well, or in separate n-wells to avoid reliability problems. The P-type MOSFETs 602, 612, 622, . . . , 632, 642 operate in an inverse manner compared to the N-type MOSFETs 102, 112, 122, . . . , 132, 142. Second inverters 604, 614, 624, . . . , 634, 644 are inserted in the ESD clamp stages 600, 610, 620, . . . , 630, 640 to properly bias the MOSFETs 602, 612, 622, . . . , 632, 642. First inverters 601, 611, 621, . . . , 631, 641 and the second inverters 604, 614, 624, . . . , 634, 644 of the ESD clamp 60 may be CMOS inverters having structure similar to that of the inverters 101, 141 shown in FIGS. 4 and 5.

Biasing of the first inverters 601, 611, 621, . . . , 631, 641 is substantially the same as that of the inverters 101, 111, 121, . . . , 131, 141 shown in FIG. 1. Outputs of the first inverters 601, 611, 621, . . . , 631, 641, however, are not electrically connected to gate electrodes of the corresponding MOSFETs 602, 612, 622, . . . , 632, 642, but are instead electrically connected to inputs of the second inverters 604, 614, 624, . . . , 634, 644, which invert output signals of the first inverters 601, 611, 621, . . . , 631, 641 prior to reaching the gate electrodes of the MOSFETs 602, 612, 622, . . . , 632, 642 (nodes 605, 615, 625, . . . , 635, 645, respectively). The gate electrodes of the MOSFETs 602, 612, 622, . . . , 632, 642 are controlled by the first inverters 601, 611, 621, . . . , 631, 641 and the second inverters 604, 614, 624, . . . , 634, 644. The second inverters 604, 614, 624, . . . , 634, 644 are biased similarly to the first inverters 601, 611, 621, . . . , 631, 641 and the inverters 101, 111, 121, . . . , 131, 141. The second inverter 604 of the first clamp stage 600 has a first power terminal electrically connected to the top voltage supply node, and a second power terminal electrically connected to the first intermediate voltage supply node ((n-1)X-VDD). The second inverter 614 has a first power terminal electrically connected to the output of the first inverter 601 and the input of the second inverter 604 (node 603), and a second power terminal electrically connected to the second intermediate voltage supply node ((n-2)X-VDD). The second inverter 624 has a first power terminal electrically connected to the output of the first inverter 611 and the input of the second inverter 614 (node 613), and a second power terminal electrically connected to the third intermediate voltage supply node ((n-3)X-VDD). The second inverter 644 has a first power terminal electrically connected to an output of the first inverter 631 and the input of the second inverter 634 (node 633), and a second power terminal electrically connected to the bottom voltage supply node (e.g., ground, 0 Volts).

In normal operation, an RC trigger circuit 650 similar to the RC trigger circuit 150 shown in FIG. 1 normally biases an input of the first inverter 601 (node 603) at a voltage level of a top voltage supply node (e.g., the system voltage, nX-VDD). The first inverter 601 inverts the nX-VDD voltage level to the ((n-1)X-VDD) voltage level at its output (node 603). The first inverter 611 inverts the ((n-1)X-VDD) voltage level to the ((n-2)X-VDD) voltage level, the first inverter 621 inverts the ((n-2)X-VDD) voltage level to the ((n-3)X-VDD) voltage level, and so on until the first inverter 641 inverts the 1X-VDD voltage level to about 0 Volts.

The second inverters 604, 614, 624, . . . , 634, 644 invert the outputs of the first inverters 601, 611, 621, . . . , 631, 641 as follows. The second inverter 604 inverts the ((n-1)X-VDD) voltage at the output of the first inverter 601 to the nX-VDD voltage, the second inverter 614 inverts the ((n-2)X-VDD) voltage to the ((n-1)X-VDD) voltage, the second inverter 624 inverts the ((n-3)X-VDD) voltage to the ((n-2)X-VDD) voltage, and so on until the second inverter 644 inverts the 0-Volt output of the first inverter 641 to the 1X-VDD voltage. As a result, the MOSFET 600 is turned off due to the same voltage (nX-VDD) biasing source and gate terminals thereof ($V_{sg}=0$).

During an ESD zapping event, with the integrated circuit die unpowered, a node 653 between the RC trigger circuit 650 and the first inverter 601 is floating, and may be considered roughly grounded (about 0 Volts). The first inverters 601, 611, 621, . . . , 631, 641 operate similarly to the inverters 101, 111, 121, . . . , 131, 141, passing on high voltage from the ESD charge to the inputs of the second inverters 604, 614, 624, . . . , 634, 644. With the second power terminals of the second inverters 604, 614, 624, . . . , 634, 644 floating (e.g., grounded), the high voltage at the inputs of the second inverters 604, 614, 624, . . . , 634, 644 acts to pull the gate electrodes of the MOSFETs 602, 612, 622, . . . , 632, 642 to the low floating voltage (e.g., about 0 Volts), which turns on all of the MOSFETs 602, 612, 622, . . . , 632, 642, and discharges the ESD charge to ground.

Figure 7:
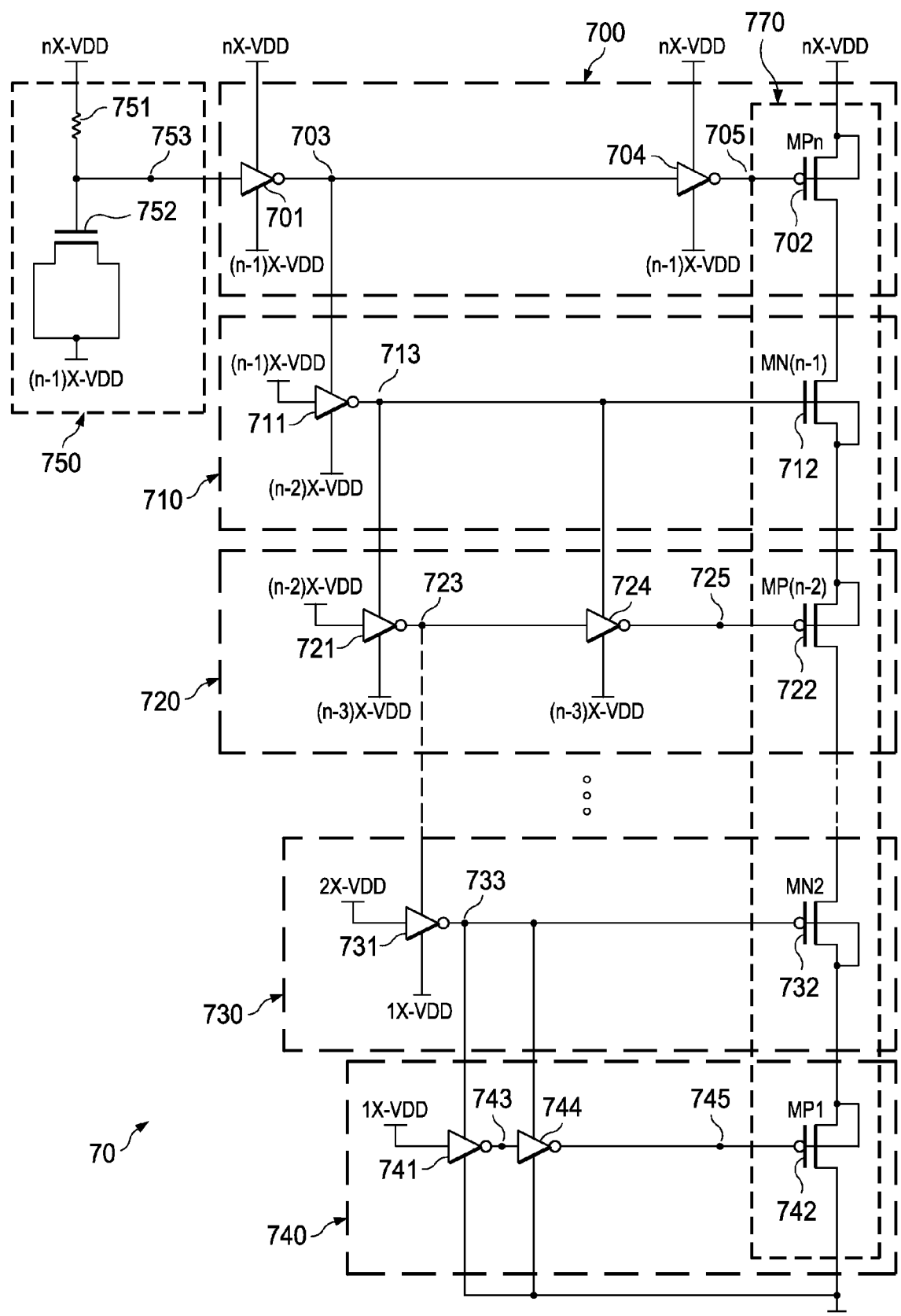
FIG. 7 is a circuit diagram showing a hybrid nX-VDD clamping circuit in accordance with various embodiments of the present disclosure.

A hybrid nX-VDD clamping circuit 70 (or simply "hybrid clamping circuit 70") in accordance with various embodiments of the present disclosure is shown in FIG. 7. The hybrid clamping circuit 70 includes both N-type and P-type MOSFETs in an ESD discharge path 770 from the top voltage supply node to ground. In FIG. 7, alternating N-type and P-type MOSFETs are shown as one example. Other arrangements of N-type and P-type MOSFETs in the ESD discharge path are also contemplated herein. In general, a clamp stage using an N-type MOSFET will only include one inverter, whereas a clamp stage using a P-type MOSFET will include two inverters. Gate electrodes of the N-type MOSFETs are controlled by corresponding first inverters, and gate electrodes of the P-type MOSFETs are controlled by corresponding first and second inverters. For example, a clamp stage 700 using a P-type MOSFET 702 includes a first inverter 701 and a second inverter 704, and a clamp stage 710 using an N-type MOSFET 712 includes a first inverter 711. Likewise, clamp stages 720 and 740 use P-type MOSFETs 722 and 742, respectively, and include first inverters 721, 741 and second inverters 722, 742, respectively. A clamp stage 730 includes a first inverter 731. First power terminals of inverter(s) in a first clamp stage (e.g., the clamp stage 700) are electrically connected to the top voltage supply node, and second power terminals of the inverter(s) are electrically connected to an ((n-1)X-VDD) node. First power terminals of inverter(s) in subsequent clamp stages (e.g., the clamp stages 710, 720, ..., 730, 740) are electrically connected to the output of the first inverter of the previous stage. For example, the first power terminal of the first inverter 721 is electrically connected to the output of the first inverter 711 of the clamp stage 710, and so on down to the first inverter 741 of the last clamp stage 740, which has a first power terminal electrically connected to the output of the first inverter 731 of the clamp stage 730. Second power terminals of inverter(s) in the same clamp stage are electrically connected to the same voltage supply node. For example, the inverters 721, 724 of the clamp stage 720 have second power terminals electrically connected to an ((n-3)X-VDD) voltage node.

In normal operation, the first inverters 701, 711, 721, ..., 731, 741 operate similarly to the first inverters 101, 111, 121, ..., 131, 141 shown in FIG. 1 and the first inverters 601, 611, 621, ..., 631, 641 shown in FIG. 6, acting to establish voltages of (n-1)X-VDD, (n-2)X-VDD, (n-3)X-VDD, ..., 1X-VDD, and 0 Volts at the nodes 703, 713, 723, ..., 733, and 743, respectively. The second inverters 704, 724, ..., 744 invert the voltages at the nodes 703, 723, ..., 743 to output the voltages nX-VDD, (n-2)X-VDD, ..., 1X-VDD at the nodes 705, 725, ..., 745, respectively. In the configuration shown in FIG. 7, the MOSFET 702 is turned off (Vsg=(nX-VDD)-(nX-VDD)=0) by the second inverter 704 in normal operation. In some embodiments, the last transistor 742 may be an N-type MOSFET instead of the P-type MOSFET shown in FIG. 7, so that the voltage level of the node 743 turns off the last transistor 742 (Vgs=0-0=0) in normal operation.

Figure 8:
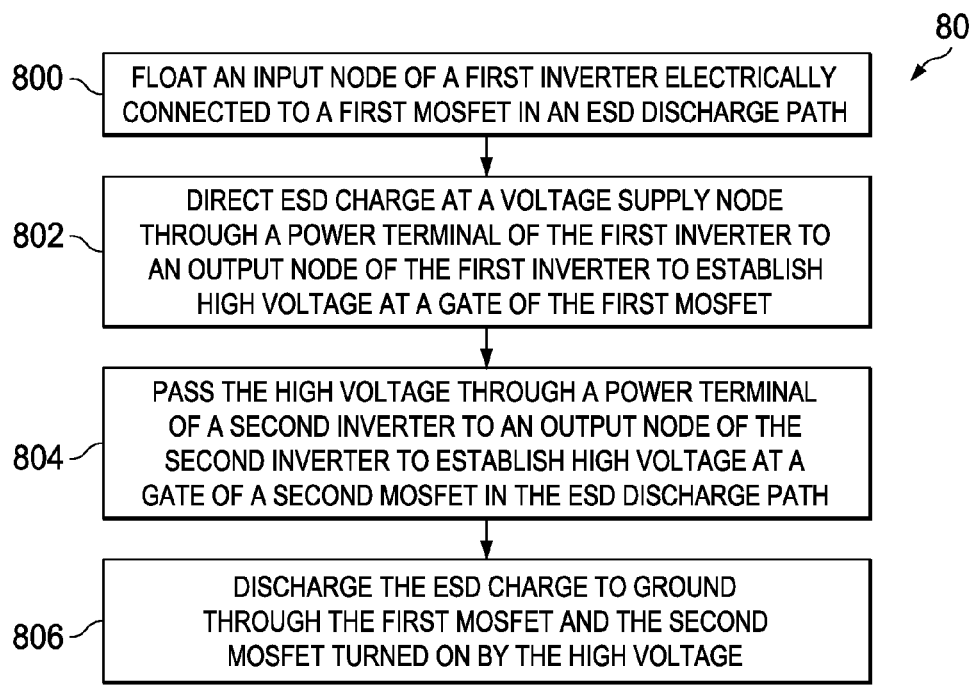
FIGS. 8, 9 and 10 show ESD discharge processes in accordance with various embodiments of the present disclosure.
Figure 9:
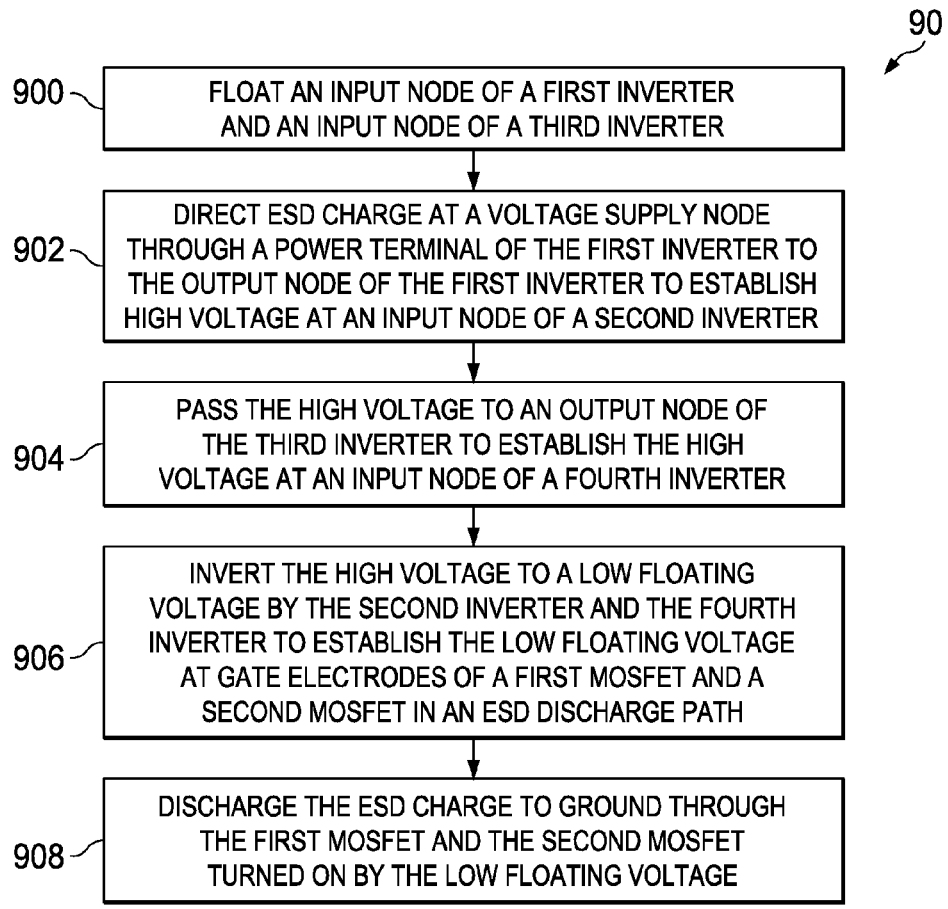

ESD discharge processes 80, 90 are depicted as flowcharts in FIGS. 8 and 9. The ESD discharge process 80 is used with the ESD clamp 10 of FIG. 1, and the ESD discharge process 90 is used with the ESD clamp 60 of FIG. 6. Referring to FIGS. 8 and 1, in block 800, the input of the inverter 101 is floated through the RC trigger circuit 150, for example. The inverter 101 is electrically connected to the gate terminal of the MOSFET 102. In block 802, the ESD charge at the top voltage supply node turns on the PMOS transistor 1011 of the inverter 101 to pass the ESD charge to the output node of the inverter 101 (as shown in FIG. 4), which sets up a high voltage at the gate electrode of the MOSFET 102. The high voltage similarly passes through the inverter 111 to appear at the gate electrode of the MOSFET 112 in block 804. The high voltage turns on the MOSFETs 102, 112 in the ESD discharge path 170 to discharge the ESD charge to ground through the MOSFETs 102, 112 in block 806.

The ESD discharge process 90 is used with the ESD clamp 60 of FIG. 6. Referring to FIGS. 9 and 6, in block 900, the input of the first inverter 601 is floated through the RC trigger circuit 650, for example, and the input of the first inverter 611 is floated through the intermediate voltage supply node. The first inverter 601 is electrically connected to the second inverter 604, which is electrically connected to the gate terminal of the MOSFET 602. The first inverter 611 is electrically connected to the second inverter 614, which is electrically connected to the gate terminal of the MOSFET 612. In block 902, the ESD charge at the top voltage supply node causes the first inverter 601 to pass the ESD charge to the output node of the first inverter 601, which sets up a high voltage at the input of the second inverter 604. The high voltage is passed on to the input of the second inverter 614 by the first inverter 611 in block 904. The gate electrodes of the MOSFETs 602, 612 are pulled low to a low floating voltage (e.g., about 0 Volts) through the second inverters 604, 614, which invert the high voltage at their respective inputs in block 906. With the low floating voltage biasing the gate electrodes of the MOSFETs 602, 612 in the ESD discharge path 670, and the high voltage biasing the source electrodes of the MOSFETs 602, 612 due to the ESD charge at the top voltage supply node, the MOSFETs 602, 612 turn on to discharge the ESD charge to ground through the MOSFETs 602, 612 in block 908.

Figure 10:
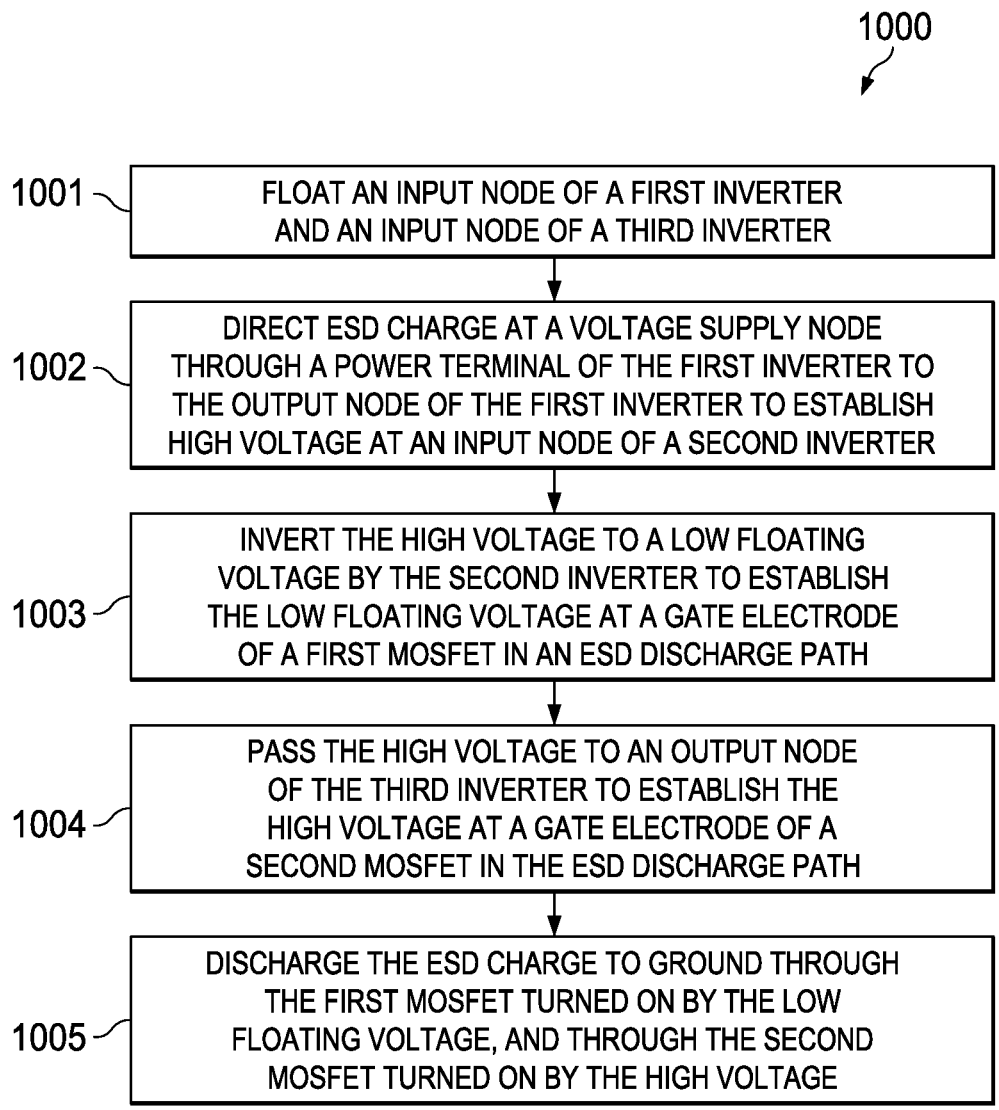

An ESD discharge process 1000 used in hybrid nX-VDD ESD clamps, such as the ESD clamp 70 of FIG. 7, is shown in FIG. 10. In block 1001, input nodes of the first inverters 701, 711 are floating. When an ESD zapping event occurs, ESD charge builds up rapidly at the top voltage supply node. The ESD charge is directed to the output of the first inverter 701 from the first power terminal of the first inverter 701, which establishes a high voltage at an input node of the second inverter 704 in block 1002. The high voltage is inverted by the second inverter 704 to pass a low floating voltage from the second power terminal of the second inverter 704 to the gate electrode of the MOSFET 702 in the ESD discharge path 770 in block 1003. In block 1004, the high voltage is passed to the output of the first inverter 714 to establish the high voltage at the gate electrode of the MOSFET 712. The MOSFET 702, being biased by the low floating voltage at its gate and the high voltage from the ESD charge at its source, is turned on. The MOSFET 712, being biased by the high voltage at its gate and a low voltage (e.g., ground) at its source, is also turned on. As a result, in block 1005, the ESD charge is discharged from the top voltage supply node to the bottom voltage supply node (e.g., ground) through the MOSFETs 702, 712.

The ESD clamps 10, 20, 40, 60, 70 and the ESD discharge processes 80, 90, 1000 related thereto have many advantages. Through use of inverters and a single RC trigger circuit, the nX-VDD ESD clamp architecture improves utilization rate of discharge devices (MOSFETs) in the ESD discharge path, which simplifies design, saves area, and allows for ready expansibility to 3X, 4X, 5X and greater overdrive applications. With proper biasing through the intermediate voltage supply nodes, no device in the ESD clamp is exposed to high voltage that would adversely affect reliability. The ESD clamp architecture is flexible, having N-type, P-type, and hybrid configurations to meet any process requirement. The ESD clamp also eliminates standby leakage current, which is increasingly becoming a demand in ESD protection circuit design.

Figure 11:
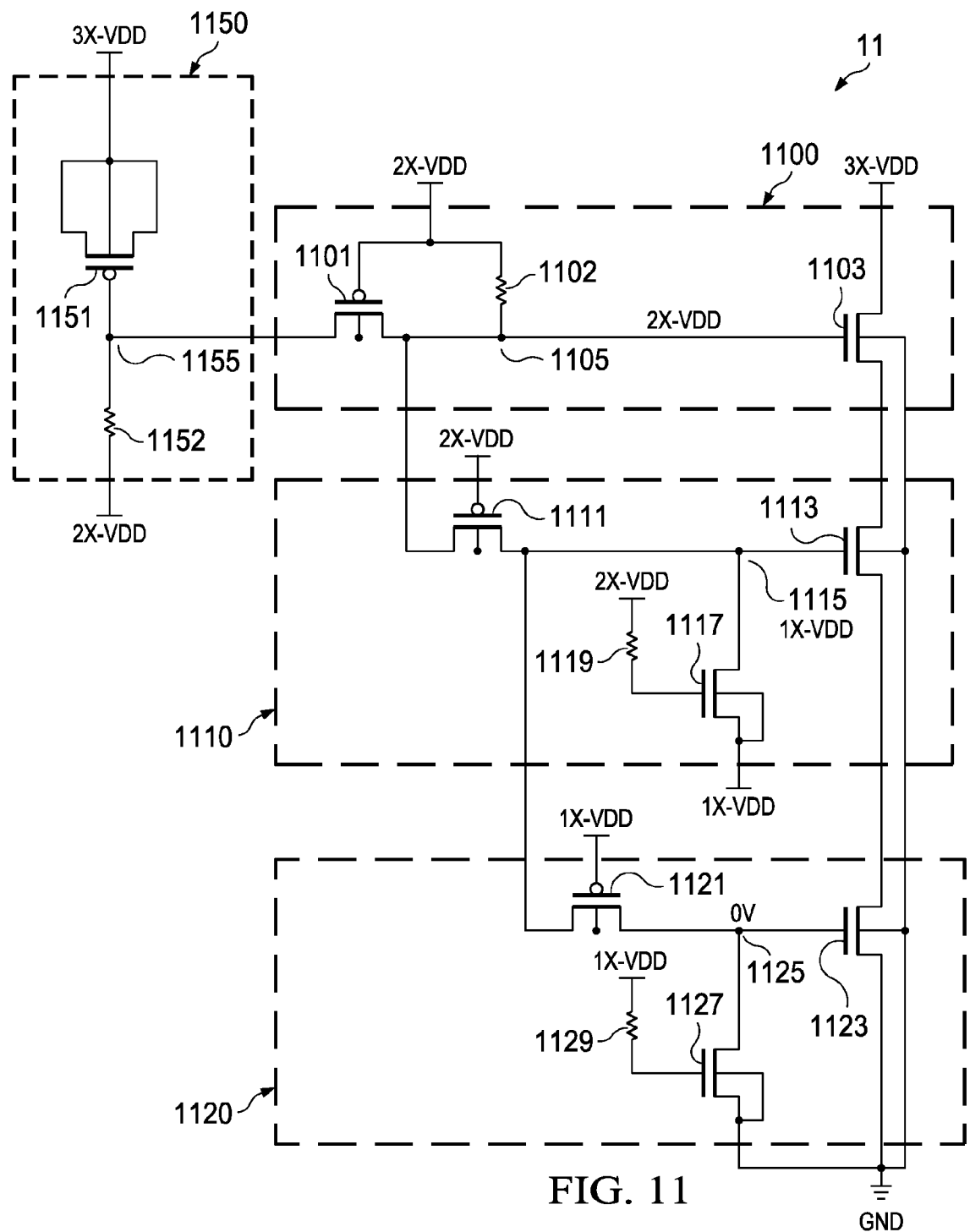
FIG. 11 is a circuit diagram of a 3X-VDD ESD clamp in accordance with various embodiments of the present disclosure.

A 3X-VDD ESD clamp 11 (or simply "ESD clamp 1100") in accordance with various embodiments of the present disclosure is shown in FIG. 11. The 3X-VDD ESD clamp 11 uses a CR trigger circuit 1150 instead of the RC trigger circuits used in the ESD clamps shown in FIGS. 1-7. A capacitor 1151 of the CR trigger circuit 1150, which may be a MOS capacitor, has a first terminal electrically connected to a top voltage supply node (3X-VDD), and a resistor 1152 of the CR trigger circuit 1150 has a first terminal electrically connected to an intermediate voltage supply node (2X-VDD). the capacitor 1151 and the resistor 1152 are electrically connected together at node 1155.

A first clamp stage 1100 takes input from the second terminals of the capacitor 1151 and the resistor 1152, and includes a first PMOS 1101, a first resistor 1102 and a first NMOS 1103. A source terminal of the first PMOS 1101 is electrically connected to the second terminals of the capacitor 1151 and the resistor 1152. A gate terminal of the first PMOS 1101 is electrically connected to the intermediate voltage supply node (2X-VDD), and a drain terminal of the first PMOS 1101 is electrically connected to a gate terminal of the first NMOS 1103 (at node 1105). The node 1105 has a path to the intermediate voltage supply node (2X-VDD) through the first resistor 1102, which has a first terminal electrically connected to the intermediate voltage supply node, and a second terminal electrically connected to the node 1105. A drain terminal of the first NMOS 1103 is electrically connected to the top voltage supply node.

A second clamp stage 1110 includes a second PMOS 1111, a second NMOS 1113, a pull-down NMOS 1117, and a second resistor 1119. The second PMOS 1111 is electrically connected at its gate terminal to the intermediate voltage supply node (2X-VDD), at its source to the node 1105, and at its drain to a gate electrode of the second NMOS 1113 (node 1115). A drain terminal of the second NMOS 1113 is electrically connected to a source terminal of the first NMOS 1103. The pull-down NMOS 1117 is electrically connected at its gate to the intermediate voltage supply node through the second resistor 1119, at its source to a second intermediate voltage supply node (1X-VDD), and at its drain to the node 1115.

A third clamp stage 1120 includes a third PMOS 1121, a third NMOS 1123, a pull-down NMOS 1127, and a third resistor 1129. The third PMOS 1121 is electrically connected at its gate terminal to the second intermediate voltage supply node (1X-VDD), at its source to the node 1115, and at its drain to a gate electrode of the third NMOS 1123 (node 1125). A drain terminal of the third NMOS 1123 is electrically connected to a source terminal of the second NMOS 1113. The pull-down NMOS 1127 is electrically connected at its gate to the intermediate voltage supply node through the third resistor 1129, at its source to a bottom voltage supply node (e.g., ground), and at its drain to the node 1125.

In an ESD zapping event, ESD charge establishes high voltage at the top voltage supply node (3X-VDD), while the intermediate voltage supply node, the second intermediate voltage supply node, and the ground are floating (e.g., at low voltage, such as 0 Volts). The high voltage pulls up voltage level at the second terminal of the capacitor 1151, and is passed through the first PMOS 1101 to the node 1105. The high voltage passes through the second PMOS 1111 to the node 1115, and through the third PMOS 1121 to the node 1125. With the nodes 1105, 1115, and 1125 all at the high voltage, the first NMOS 1103, the second NMOS 1113, and the third NMOS 1123 all turn on to discharge the ESD charge to ground.

In normal operation, the node 1155 is biased at the 2X-VDD voltage through the resistor 1152, and the node 1105 is biased at the 2X-VDD voltage through the first resistor 1102. The node 1115 is pulled down to the 1X-VDD voltage due to the pull-down NMOS 1117 being turned on by the 2X-VDD voltage biasing the gate electrode thereof through the second resistor 1119. The node 1121 is pulled down to ground due to the pull-down NMOS 1127 being turned on by the 1X-VDD voltage biasing the gate electrode thereof through the third resistor 1129. Under these biasing conditions, the first NMOS 1103 and the second NMOS 1113 are turned on, but the third NMOS 1123 is turned off (Vgs=0–0 Volts=0 Volts). As a result, the ESD clamp 11 is free of standby leakage current.

In accordance with various embodiments of the present disclosure, a multiple device voltage electrostatic discharge (ESD) clamp comprises a trigger circuit, first and second inverters, and an ESD discharge path. The trigger circuit comprises a resistor having a first terminal electrically connected to a first voltage supply node, and a capacitor having a first terminal electrically connected to a second voltage supply node. The first inverter has an input terminal electrically connected to second terminals of the resistor and the capacitor. The second inverter has a power terminal electrically connected to an output terminal of the first inverter. The ESD discharge path has a first end electrically connected to the first voltage supply node, and a second end electrically connected to a third voltage supply node, and comprises a first transistor controlled by the first inverter, and a second transistor controlled by the second inverter.

In accordance with various embodiments of the present disclosure, an electrostatic discharge (ESD) clamp comprises a trigger circuit, a first ESD clamp stage, and a plurality of second ESD clamp stages. The first ESD clamp stage comprises a first inverter having an input electrically connected to an output of the trigger circuit, and a power terminal electrically connected to a first voltage supply node, and a first transistor controlled by the first inverter, and having a first terminal electrically connected to the first voltage supply node. Each second ESD clamp stage comprises a second inverter having a power terminal electrically connected to an output of the first inverter or an output of a second inverter of a previous ESD clamp stage, and a transistor controlled by the second inverter of the second ESD clamp stage.

In accordance with various embodiments of the present disclosure, a method of discharging electrostatic discharge (ESD) charge comprises floating an input of a first inverter electrically connected to a first transistor in an ESD discharge path, directing the ESD charge through a power terminal of the first inverter to output a first voltage and establish a first bias voltage at a gate electrode of the first transistor, passing the first voltage through a power terminal of a second inverter to establish a second bias voltage at a gate electrode of a second transistor in the ESD discharge path, and discharging the ESD charge to ground through the first transistor and the second transistor turned on by the first bias voltage and the second bias voltage.

Although the present embodiments and their advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A multiple device voltage electrostatic discharge (ESD) clamp comprising:
    a trigger circuit comprising:
        a resistor having a first terminal electrically connected to a first voltage supply node; and
        a capacitor having a first terminal electrically connected to a second voltage supply node, and a second terminal connected to a second terminal of the resistor;
    a first inverter having an input terminal electrically connected to the second terminals of the resistor and the capacitor, the first inverter having a first power terminal and a second power terminal, the first voltage supply node electrically connected to supply a first voltage to the first power terminal of the first terminal, the second voltage supply node electrically connected to supply a second voltage to the second power terminal of the first inverter;
a second inverter having a power terminal, wherein an output terminal of the first inverter is electrically connected to drive the first power terminal of the second inverter, and wherein the second voltage supply node is electrically connected to supply the second voltage to an input terminal of the second inverter; and
an ESD discharge path having a first end electrically connected to the first voltage supply node, and a second end electrically connected to a third voltage supply node, the ESD discharge path comprising:
a first transistor controlled by the first inverter; and
a second transistor controlled by the second inverter.

2. The multiple device voltage electrostatic discharge clamp of claim 1, further comprising:
a third inverter having a power terminal electrically connected to the output terminal of the second inverter;
wherein the ESD discharge path further comprises:
a third transistor controlled by the third inverter.

3. The multiple device voltage electrostatic discharge clamp of claim 1, wherein the first transistor and the second transistor are N-type metal-oxide-semiconductor (NMOS) transistors.

4. The multiple device voltage electrostatic discharge clamp of claim 1, further comprising:
a third inverter controlled by the first inverter; and
a fourth inverter controlled by the second inverter;
wherein:
the first transistor is a P-type metal-oxide-semiconductor (PMOS) transistor controlled by the first and third inverters; and
the second transistor is a PMOS transistor controlled by the second and fourth inverters.

5. The multiple device voltage electrostatic discharge clamp of claim 1, further comprising:
a third inverter controlled by the first inverter;
wherein:
the first transistor is a PMOS transistor controlled by the first and third inverters; and
the second transistor is an NMOS transistor.

6. An electrostatic discharge (ESD) clamp comprising:
a trigger circuit;
a first ESD clamp stage comprising:
a first inverter having an input electrically connected to an output of the trigger circuit, and a first power terminal electrically connected to a first voltage supply node, and a second power terminal electrically connected to a second voltage supply node, the second voltage supply node electrically connected to supply a voltage to the second power terminal of the first inverter; and
a first transistor controlled by the first inverter, and having a first terminal electrically connected to the first voltage supply node; and
a plurality of second ESD clamp stages, each second ESD clamp stage comprising:
a second inverter having a power terminal, wherein an output of the first inverter or an output of a second inverter of a previous ESD clamp stage is electrically connected to drive the power terminal of the second inverter, and wherein the second voltage supply node is electrically connected to supply the voltage to an input of second inverter; and
a transistor controlled by the second inverter of the second ESD clamp stage.

7. The electrostatic discharge (ESD) clamp of claim 6, wherein the first ESD clamp stage further comprises:
a third inverter controlled by the first inverter;
wherein the first transistor is a PMOS transistor controlled by the first inverter and the third inverter.

8. The electrostatic discharge (ESD) clamp of claim 6, wherein the first ESD clamp stage further comprises:
a third inverter controlled by the first inverter; and
each second ESD clamp stage further comprises:
a fourth inverter controlled by the second inverter of the second ESD clamp stage; wherein:
the first transistor is a PMOS transistor controlled by the first inverter and the third inverter; and
the second transistor is a PMOS transistor controlled by the second inverter and the fourth inverter.

9. The electrostatic discharge (ESD) clamp of claim 6, wherein the first transistor and each second transistor is an NMOS transistor.

10. A method of discharging electrostatic discharge (ESD) charge, comprising:
floating an input of a first inverter using a trigger circuit, the first inverter electrically connected to a first transistor in an ESD discharge path;
directing the ESD charge through a power terminal of the first inverter to output a first voltage and establish a first bias voltage at a gate electrode of the first transistor;
passing the first voltage through a power terminal of a second inverter to establish a second bias voltage at a gate electrode of a second transistor in the ESD discharge path; and
discharging the ESD charge to ground through the first transistor and the second transistor turned on by the first bias voltage and the second bias voltage, wherein the floating the input of the first inverter using the trigger circuit comprises floating the input of the first inverter, but not an input of the second inverter, using the trigger circuit.

11. The method of claim 10, wherein the first transistor is an NMOS transistor, the second transistor is an NMOS transistor, the first bias voltage is the first voltage, and the second bias voltage is the first voltage.

12. The method of claim 10, wherein the first transistor is a PMOS transistor, and the step of directing the ESD charge comprises:
inverting the first voltage to establish the first bias voltage;
wherein the first bias voltage is lower than the first voltage.

13. The method of claim 10, wherein the second transistor is a PMOS transistor, and the step of passing the first voltage comprises:
inverting the first voltage to establish the second bias voltage;
wherein the second bias voltage is lower than the first voltage.

14. The multiple device voltage electrostatic discharge clamp of claim 1, wherein a voltage potential of the third voltage supply node is lower than the first voltage.

15. The multiple device voltage electrostatic discharge clamp of claim 1, wherein a voltage potential of the third voltage supply node is equal to the second voltage.

16. The multiple device voltage electrostatic discharge clamp of claim 1, wherein a voltage potential of the third voltage supply node is equal to a ground potential.

17. The multiple device voltage electrostatic discharge clamp of claim 1, wherein the first end of the ESD discharge path comprises a drain electrode of the first transistor, and wherein the second end of the ESD discharge path comprises a source electrode of the second transistor.

18. The multiple device voltage electrostatic discharge clamp of claim 1, wherein a source electrode of the first transistor is electrically connected to a drain electrode of the second transistor.

19. The electrostatic discharge (ESD) clamp of claim 6, wherein a drain electrode of the transistor of the second ESD clamp stage is electrically connected to a source electrode of a transistor of the previous ESD clamp stage.

20. The electrostatic discharge (ESD) clamp of claim 6, wherein the first terminal of the first transistor comprises a drain electrode of the first transistor.

* * * * *